Nov. 25, 1952 — R. ROSELIEB — 2,618,791
BEEHIVE COVER
Filed May 14, 1947 — 2 SHEETS—SHEET 2
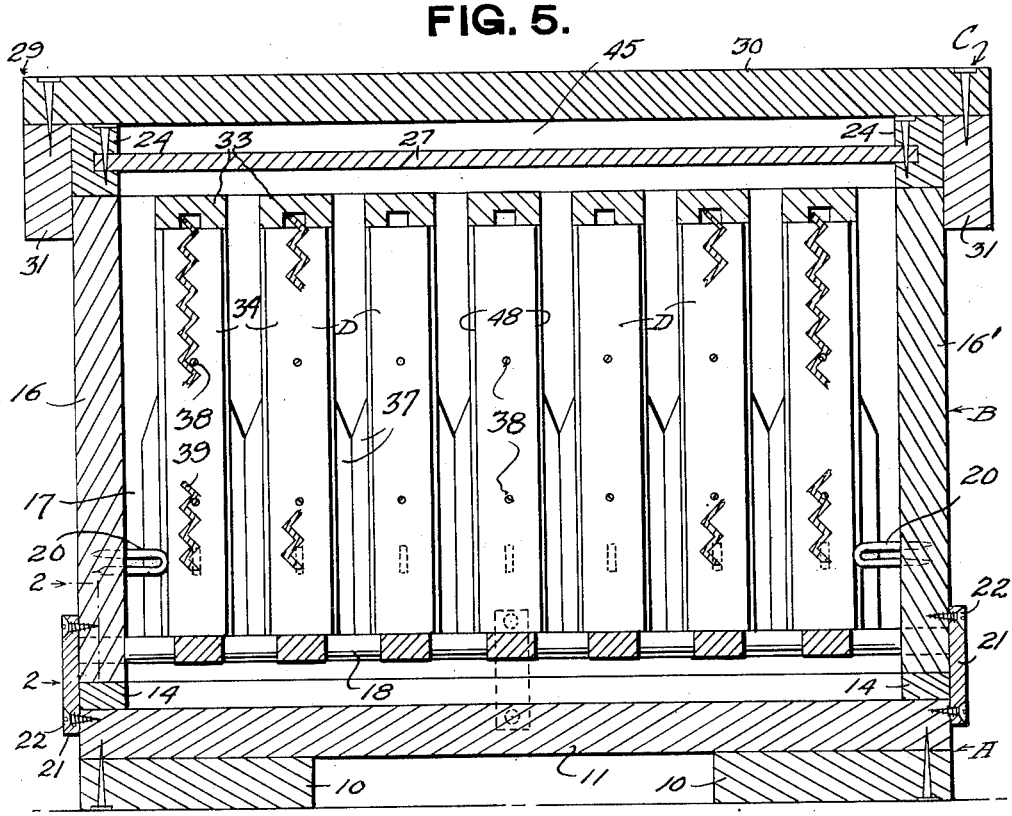
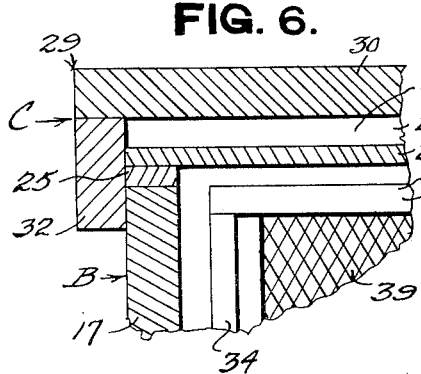
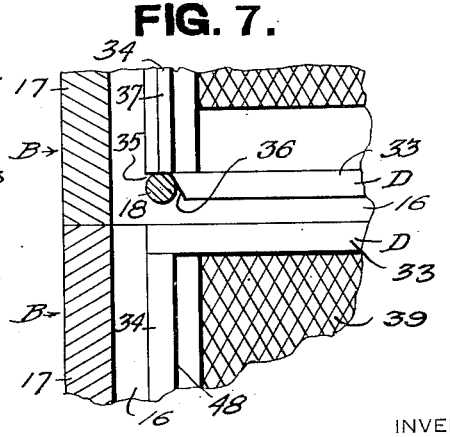
INVENTOR.
Roy Roselieb Patented Nov. 25, 1952

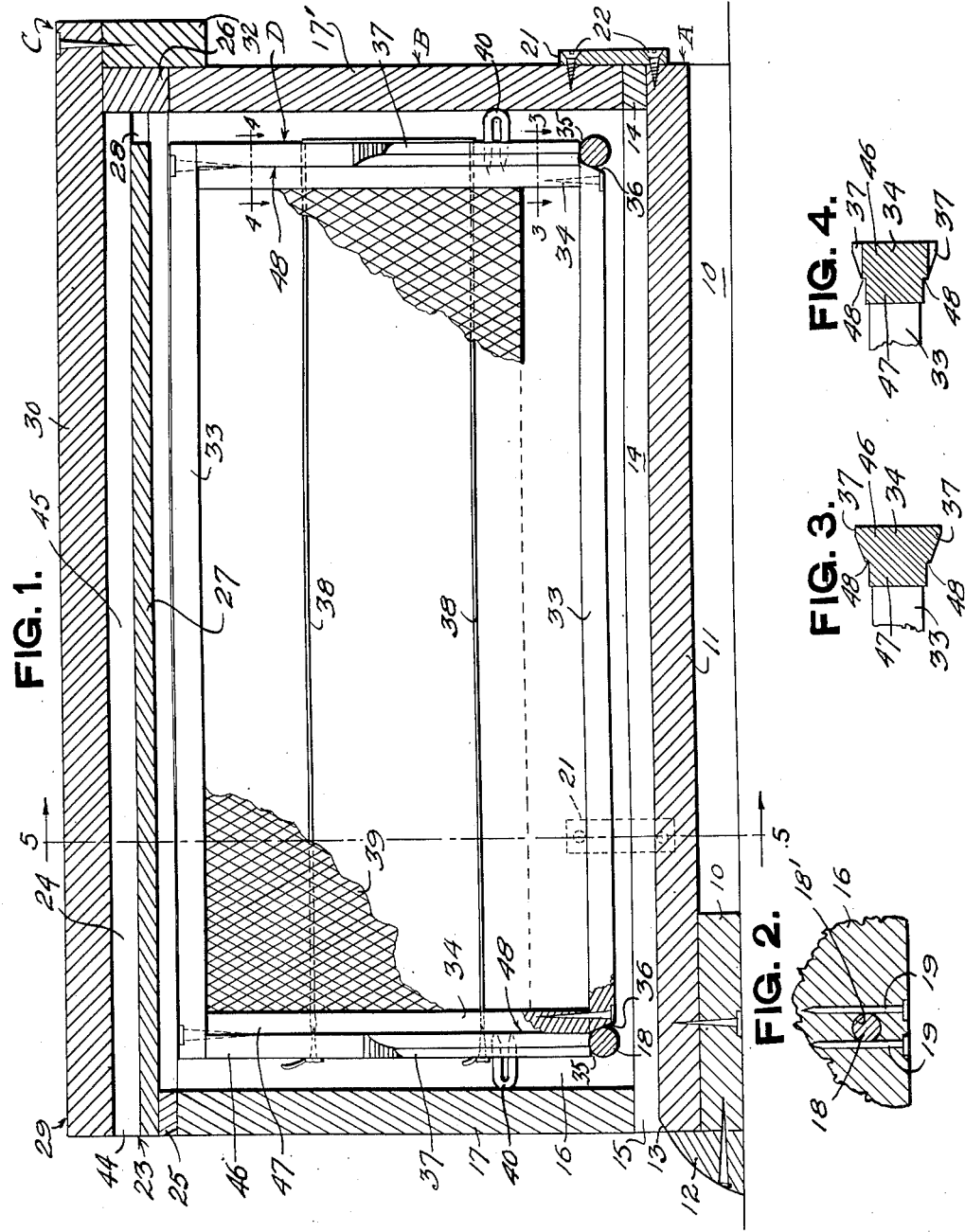

2,618,791

UNITED STATES PATENT OFFICE 2,618,791

BEEHIVE COVER

Roy Roselieb, Prophetstown, Ill.

Application May 14, 1947, Serial No. 748,042

4 Claims. (Cl. 6—1)

This invention relates to improvements in beehives and more particularly to so called "movable comb beehives" with three main purposes, First, greater convenience in handling of the comb frames by the apiarist. Second, greater convenience for the bees to control the temperature of the hive and third, stronger structural design.

Other objects, details and advantages will appear in the following specification supplemented by the accompanying drawings forming a part thereof and illustrating a highly satisfactory form of beehive in accordance with my invention as falling within the broad scope of the appended claims.

In the drawings:

Fig. 1 is a longitudinal vertical sectional view of a beehive in accordance with my invention.

Figs. 2, 3, and 4 are sectional details, on an enlarged scale, taken respectively on lines 2—2 of Fig. 5 and 3—3 and 4—4 of Fig. 1.

Fig. 5 is a crosswise vertical sectional view of the beehive.

Fig. 6 is a fragmentary longitudinal vertical sectional view illustrating a reverse arrangement of the beehive cover.

Fig. 7 is a fragmentary longitudinal vertical sectional view illustrating the manner in which beehive sections are arranged in tiers in accordance with the present invention.

Referring to the drawings, in general, the beehive in accordance with my invention comprises a base A with a hive section B supported thereon and preferably secured in place, or a plurality of such hive sections B, B, arranged as indicated in Fig. 7, and a cover C. The beehive houses a tier of honeycomb frames D in each hive section B.

Base A is rectangular in plan, its sides being preferably longer than its ends and, in the form illustrated, being so dimensioned that it will support hive sections B, accommodating seven relatively long honeycomb frames D within each hive section. Base A, in the example shown, comprises supporting strips 10 under the sides and front end of a rectangular flat baseboard 11 and at the entrance end of the hive (the ends of the comb frames D) the base is formed for an entrance with a sloping or quarter round strip 12 cooperating with a slight incline 13 along end of baseboard 11. The edge of baseboard 11, except at the entrance end, is provided with a border strip 14, or rim member, having a height sufficient to support the hive section B above baseboard A so that the entrance opening 15 will be a "bee space" in height.

The hive section B (or sections B, B as shown in Fig. 7) comprises a rectangular frame consisting of four boards, sides 16 and 16' and ends 17, 17' which when fabricated have the same rectangular dimensions as base A and are of a height in excess of the height of the comb frames D by a "bee space," so that when the honeycomb frames are positioned in the hive section there is a "bee space" above the plane of the bottom edge of the section and the tops of the honeycomb frames are substantially in the plane of the top of the hive section.

The supports for the honeycomb frames in the hive section comprise a pair of cross bars 18, preferably in the form of metal rods, one adjacent to each end wall 17 and 17' of the section, passing through apertures 18' in the side walls so that the undersurface of the rods are substantially a "bee space" above the lower plane of the hive section. These cross bars 18 support the ends of the honeycomb frames, as will be described, and are secured in place by a nail or pair of nails 19 as shown in Fig. 2, one each side of the rod in the side walls 16 and 16' in tight engagement with the sides of rods 18 so as to hold them substantially in their positions for supporting the honeycomb frames. These nails 19 also serve to reinforce the side walls 16 at the zones where the apertures 18' are provided.

As shown in Fig. 5 the side walls 16 and 16' each has spacing elements 20 conveniently in the form of staples as shown, one adjacent each end positioned for engaging end portions of the honeycomb frames to properly space them from the side walls of the hive section as they are being placed in or withdrawn from the hive section B.

The hive section B is preferably secured to the base A by means of a plurality of cleats 21, removably secured in place by screws 22 during shipment.

The cover C includes a top section 23 comprising a rectangular frame having side elements 24 and end elements 25 and 26 which have the same dimensions as hive section B and base A. The frame side elements 24 are preferably grooved to receive a panel 27 which extends over end element 25 and approaches end element 26, being spaced therefrom a "bee space" in width as a way in which to provide an opening 28, and the frame elements 24 and 26 are of a height so that the space above and below the panel 27 is substantially a "bee space." This top section 23 is positioned on the hive section B so that the opening 28 is at the opposite end of the hive from entrance opening 15 of base A below the hive section B.

Over top section 23 of cover C, a moisture proof cover section 29 is provided, comprising a flat coverboard 30, as shown in Fig. 1 coextensive with the front end of the hive and extending beyond the sides and rear end of the hive and provided with depending side and end strips 31 and 32 which overlie the sides and one end of cover section 23 and the corresponding upper portions of hive section B. In this arrangement the space above panel 27 in cover section 23 has an exit 44 open to the atmosphere at the front end of the hive but cover section 29 may be reversed so as to close the space as shown in Fig. 6. It will be noted that, by the arrangement described a corridor 45 is provided above the upper face of panel 27 and the underface of coverboard 30, this corridor being substantially a "bee space" in height.

In cold weather the warm air inside the hive rises, passing through the rear opening 28, thence forward through the corridor 45 between covers and out at the exit 44. Due to the length of horizontal travel involved only sufficient warm air escapes and fresh air enters at the bottom to carry off excess moisture.

In warm weather the bees can increase the volume of air through the hive by "fanning" or forcing an air draft in its natural direction through the corridor 45 in the right amount needed to control the temperature of the hive.

As bees will not store and seal honey in direct rays of daylight the cover C is also designed in this way to allow ventilation of the hive, without allowing daylight to enter the top of the hive.

In their natural state the bees place the honey at the top of the brood at the bottom of the hive.

The "fanning" bees are in the corridor 45 out of the way of the bees working in the hive, which relieves congestion in the hive. This upper opening to the hive also prevents the smothering of colonies in winter due to dead bees clogging a bottom entrance.

This arrangement provides an exit 44 for the outlet of excess moisture, gases and abnormally warm air only and is not used by the bees for leaving and returning to the hive due to the length of travel involved to reach the combs. The entrance serves both for the inlet of fresh air and a front door through which the field bees travel into and from the hive, and the exit 44 is not used by the bees for that purpose due to the corresponding sizes of the passages, openings and length of horizontal travel involved as well as their location in relation to each other. This will automatically regulate the temperature in the hive except in cases of abnormally high outdoor temperatures in which case the bees can "fan" or force more air through.

The closing of the exit 44 by reversing the cover section 23, end for end, is for two reasons, both temporary. First, if a colony is to be moved both entrance and exit should be closed to confine the bees to the hive. Second, if a colony is too weak in numbers to create enough heat for maximum brood rearing, the exit 44 may be closed, shutting off all escape of heat at the exit, until enough bees have hatched to build the colony up to normal.

A good example is when a small swarm of bees is placed in an empty hive in cool weather of early spring. The brood must be kept at approximately 90 degrees F. No brood is reared during the winter months. During this time the bees form a cluster just inside and above the entrance, between the combs and in the cells of the brood combs from which the brood has emerged and keep this cluster at a minimum of 57 degrees F.

As individual bees die from old age, they drop down on the bottom board just inside the entrance. During a long continued cold spell during which the live bees do not dare leave the cluster to remove the dead from the hive for fear of freezing to death, enough of these dead bees will accumulate to clog the entrance from the inside of the hive. Under such conditions the entire colony would smother for lack of air if it were not for an upper opening 44 to the outside air. In cold climates the lower opening or entrance may be reduced in size during the winter.

This arrangement provides for the control of the escape of excess moisture vapor and warm air by means of the amount of horizontal travel involved, and of proportionate height to length of the corridor 45 (width being same as inside of hive case). The height should be approximately 2.5% of its length but in no case less than a bee space to allow "fanning" bees to enter it in hot weather through the rear opening 28 from the hive proper. If the height of the corridor is too great heat from the cluster will escape faster than necessary to carry off excess moisture vapor in winter and force the bees to unnecessary consumption of stores to keep warm.

As bees, if allowed their natural instincts, will rear their brood underneath the stores of sealed honey, and as they will not store and seal honey where the field workers leave and enter on the combs (but will rear brood at this place), this arrangement of the long corridor for upward controlled ventilation also blocks light from entering on the combs.

Each honeycomb frame comprises two horizontal bars 33 and two vertical bars 34 and preferably the frame is longer horizontally than vertically.

The four bars 33 and 34 of the frames are joined together at their ends to form four right angle corners with the exception that the two lower corners are fastened together in such a way as to make a recess 35 at each corner, of the correct size to accommodate the cross bars 18 just within the corner of the frame. When the frame is placed upon the cross bars the lower horizontal bar inserts between the cross bars holding the frame at proper end spacing and the vertical bars rest directly on the cross bars at right angles as shown in Fig. 1.

The round cross bars 18 upon which the frames D rest carry the load at the lower edges of the sides of the hive section B. In this way the frames are supported to the case itself without strain on the corners of the case. Any hive in which the frames are supported at the top has a tendency to crowd the corners apart. The round cross bars 18 help guide the honeycomb frames B into place when positioning them in the hive, this being facilitated by cutting the ends of the bottom bars on an angle for the purpose, as shown at 36.

Also, as the load of the frames and contents are supported at the lower edges of the sides of the hive section, in the manner described, there is no strain to cause the corners of the hive section to come apart and let the frames drop down through the hive section or sections.

The round shape of the cross bars 18 as mentioned above helps guide the frame in place. Each frame is the rim of a flat comb to be built within its area. The frames D are preferably held the proper distance from the sides of the case by spacing elements 20, such as referred to in the description of the hive section B, or similar devices, driven in the sides of the hive section and contacting the vertical bars of the nearest comb frame at the lower ends.

The frames D and combs therein are held at the correct distances from the inside surfaces of the hive section to allow the necessary passage of bees and circulation of air between, but at no point is it less than will allow a bee to pass through (commonly known as a "bee space").

As any number desired of these hive sections B may be used, placed one on top of the other, as shown in Fig. 6 the lower edge extends downward enough lower than the under surface of the frames D located in it, to hold them a "bee space" above the frames in the lower section. The tops of the frames are substantially level with the top of the case.

The comb frames are preferably spaced apart by "Hoffman" shoulders 37 that are located on the front edges of the vertical bars 34. These contact each other along the lower half of the height of the frame and as they are part of the vertical bars 34, the lower ends rest on the cross bar 18 giving the maximum width of bearing at the base. See Figs. 3 and 4.

Bees naturally glue together all points of contact and as these are all below the lower half of the height, the apiarist has the leverage from above to loosen and remove any frame from the case.

The vertical bars 34 are each preferably formed with an outer, major longitudinal portion 46 and an inner, minor longitudinal portion 47, nearest the comb, of less width than the portion 46, presenting longitudinal shoulders 48 as shown in Figs. 3 and 4. These shoulders enable a person, when supporting the frame in his hand in a pendant position, to obtain a firm grasp on the selected bar 34 with the thumb on one side and the fingers on the other side of the bar, such as when placing the filled frame in an extractor pocket. With the ordinary types of frames, which do not have the inner minor longitudinal portions, the tendency is to clinch the thumb and fingers around the bar, damaging the honeycomb attached to it.

Horizontal wires 38, which help support the comb foundation 39, are strung and drawn tight between the vertical bars of the frame. As this makes a tendency to bow the vertical bars inward and allow the combs to sag, the added strength of the minor portion 47 of each bar 34 resists this bowing.

By the provision of bars each comprising the portions 46 and 47, a shorter bottom bar 33 is used to allow room for the cross bars 18 at its ends.

Spacing element 40, such as a staple, is secured to and projects from the outer face of each vertical bar 34 which serves as a thumb rest. By placing the thumb against one side of the spacing element and the fingers under the shoulder on the opposite side of the vertical bar, a grip is obtained with the thumb out of the way of an uncapping knife. This spacing element 40 also serves as a bumper to prevent crushing of bees between the ends of the frames and the inside of the case when removing the frames. It will, if placed almost to the lower end of the vertical bar, serve as a bumper at the frame ends until the frame is entirely removed from the case, and serve equally as well as a thumb rest.

Having shown and described a highly satisfactory embodiment of a beehive in accordance with my invention, it is not desired to be restricted to the specific details of construction thereof as obvious changes may be resorted to within the scope of my invention.

What I claim as my invention and desire to secure by Letters Patent is:

1. A sectional beehive comprising a base section, supported thereon, said base section being provided with a bee entrance opening at the front thereof, a horizontal panel section carried by the hive section at the top thereof and providing an upward bee passage at the rear thereof, and a cover section extending over and spaced above said panel and having depending side members and an end member overlying the upper portions of the sides and rear of the hive and providing a bee passage corridor between the panel and said cover.

2. In a beehive, a hive section and a cover section, said hive section characterized by having a panel forming an upper closure therefor except at one end of the hive section, and said cover extending over said panel in spaced relation thereto, providing a "fanning" chamber between it and said panel, and said cover section having an opening in its end adjacent the end of the hive section opposite said first mentioned end and in line with said "fanning" chamber.

3. A sectional beehive comprising a hive section provided with a bee entrance at its lower portion, and a cover for the said hive section, said cover comprising an inner horizontal panel supported by the upper portion of the hive section, an outer horizontal panel above said inner panel, and means retaining said panels in spaced relation substantially a bee space, to provide a corridor between the panels, said inner panel providing an opening for passage of air from the hive section to the space between said panels, and said means providing an opening remote from said first mentioned opening for passage of air from said corridor, whereby bees in said corridor may regulate or shut off passage of air with respect to said openings and corridor.

4. The beehive as specified in claim 3 in which one at least of said openings is elongated in shape and of substantially a bee space in width.

ROY ROSELIEB.

REFERENCES CITED

The following references are of record in the file of this patent:

UNITED STATES PATENTS

| Number | Name | Date |
| --- | --- | --- |
| 110,937 | Sisson | Jan. 10, 1871 |
| 123,483 | Kenyon | Feb. 6, 1872 |
| 319,979 | Koch | June 16, 1885 |
| 323,220 | Shirley | July 28, 1885 |
| 620,859 | Taylor | Mar. 7, 1899 |
| 918,052 | Hurst | Apr. 13, 1909 |
| 1,122,697 | Danzenbaker | Dec. 29, 1914 |
| 1,154,176 | Danzenbaker | Sept. 21, 1915 |
| 1,348,925 | Baxter | Aug. 10, 1920 |
| 1,357,832 | Biggs | Nov. 2, 1920 |
| 1,414,393 | Bamberger | May 2, 1922 |
| 1,476,453 | McKay | Dec. 4, 1923 |
| 2,150,067 | Kelley | Mar. 7, 1939 |
| 2,261,298 | Silver | Nov. 4, 1941 |
| 2,274,090 | Olson | Feb. 24, 1942 |